United States Patent [19]

Tsujimoto et al.

[11] Patent Number: 4,632,987

[45] Date of Patent: Dec. 30, 1986

[54] PROCESS FOR THE PREPARATION OF TRIARYLMETHANE COMPOUNDS

[75] Inventors: Michihiro Tsujimoto, Tachikawa; Hiroyuki Akahori, Yokosuka; Kiyoharu Hasegawa, Kamakura; Makoto Asano, Yokohama, all of Japan

[73] Assignee: Mitsui Toatsu Chemicals Incorporated, Tokyo, Japan

[21] Appl. No.: 562,587

[22] PCT Filed: Apr. 28, 1983

[86] PCT No.: PCT/JP83/00133
§ 371 Date: Dec. 2, 1983
§ 102(e) Date: Dec. 2, 1983

[87] PCT Pub. No.: WO83/03840
PCT Pub. Date: Nov. 10, 1983

[30] Foreign Application Priority Data

Apr. 28, 1982 [JP] Japan ................................ 57-70218

[51] Int. Cl.⁴ .................... C09B 11/10; C07D 209/04; C07D 265/30; C07D 209/18

[52] U.S. Cl. ....................................... 544/86; 760/386; 760/388; 760/391; 544/165; 548/574; 548/577

[58] Field of Search ....................... 260/391, 388, 386; 544/165, 86; 548/577, 524

[56] References Cited

U.S. PATENT DOCUMENTS 3,739,000  6/1973  Lodolini et al. ................. 260/391
4,330,476  5/1982  Hermann .......................... 260/391
4,340,540  7/1982  Hermann .......................... 260/391

Primary Examiner—Richard L. Raymond
Assistant Examiner—Raymond Covington
Attorney, Agent, or Firm—Fisher, Christen & Sabol

[57] ABSTRACT

A process for the preparation of triarylmethane compounds which comprises reacting a benzene or naphthalene compound with a formylating agent for such compounds in the presence of an acid catalyst to form an aromatic aldehyde compound; adding water to the reaction mixture and thereby hydrolyzing the acid catalyst without isolating the aromatic aldehyde compound from the reaction mixture; and uninterruptedly condensing the aromatic aldehyde compound with an aromatic compound in the resulting mixture.

6 Claims, No Drawings

PROCESS FOR THE PREPARATION OF TRIARYLMETHANE COMPOUNDS

TECHNICAL FIELD

This invention relates to a process for the preparation of triarylmethane compounds. More particularly, it relates to such a process in which a benzene or naphthalene compound is formylated and the resulting intermediate product is uninterruptedly, or without isolating it, condensed with a benzene or naphthalene compound to form a triarylmethane derivative.

BACKGROUND ART

Triarylmethane compounds are known as Leucotriarylmethane dyes which include, for example, Leucomalachite Green, Leucocrystal Violet and the like. Recently, these compounds have come to be useful as dye precursor for pressure-sensitive or heat-sensitive recording paper.

Conventionally, there have been two typical methods for the synthesis of triarylmethane compounds. By way of example, the methods for the synthesis of Leucocrystal Violet (4,4′,4″-tris-dimethylaminotriphenylmethane) are represented by the following two equations.

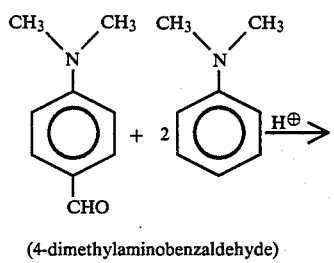

(4-dimethylaminobenzaldehyde)

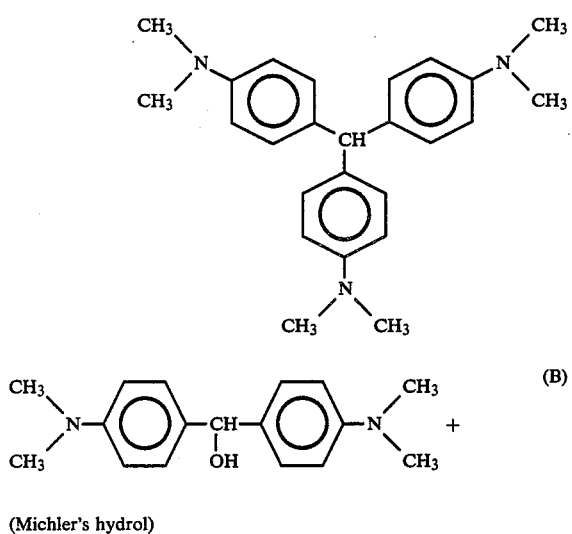

(Michler's hydrol)

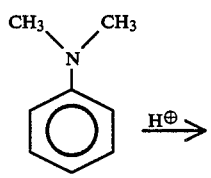

(A)

(B)

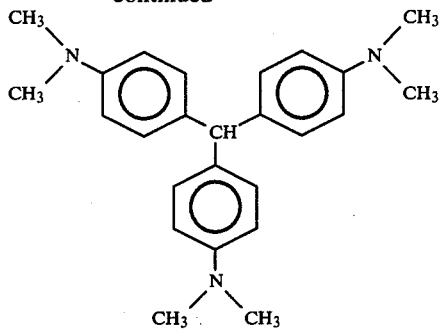

Other triarylmethane compounds can also be synthesized according to similar procedures.

In the prior art, the aromatic aldehyde used as the starting material in the method (A) is generally prepared by the Vilsmeyer process. Specifically, an aromatic compound is reacted with the Vilsmeyer reagent, i.e. a complex of a formylating agent for aromatic compounds (e.g., dimethylformamide, diethylformamide, etc.) and an acid catalyst (e.g., phosphorus oxychloride, phosphorus oxybromide, phosgene, thionyl chloride, etc.) to form an aromatic aldehyde. Then, the catalyst is hydrolyzed and the reaction system is neutralized by the addition of an alkaline substance. Thereafter, the aromatic aldehyde is separated by filtration, washed and then subjected to further purification, if necessary.

In order to obtain an aromatic aldehyde by forming and isolating it according to the above-described procedure, a large amount of alkali is required to neutralize the acid catalyst. Moreover, the resulting aromatic aldehyde is more or less soluble in water, which leads to an unavoidable reduction in yield.

On the other hand, the method (B) involves the problem of low purity of the hydrol derivative used as the starting material. This makes it difficult to obtain the desired triarylmethane derivative in a highly pure form.

DISCLOSURE OF THE INVENTION

It is an object of the present invention to provide a rational process for the preparation of triarylmethane compounds via an aromatic aldehyde compound by using an aromatic compound as the starting material.

It is another object of the present invention to provide a process for the preparation of triarylmethane compounds in which the reaction steps are continuously carried out without isolating the aromatic aldehyde compound formed as an intermediate product.

According to the present invention, there is provided a process for the preparation of triarylmethane compounds which comprises reacting a benzene or naphthalene compound with a formylating agent for such compounds in the presence of an acid catalyst to form an aromatic aldehyde compound; adding water to the reaction mixture and thereby hydrolyzing the acid catalyst without isolating the aromatic aldehyde compound from the reaction mixture; and uninterruptedly condensing the aromatic aldehyde compound with an aromatic compound in the resulting mixture to form a triarylmethane compound.

More specifically, the present process for the preparation of triarylmethane compounds comprises reacting a benzene or naphthalene compound that is substituted by a lower alkoxy group or an unsubstituted or substituted amino group and may have another substituent, with a formamide or formanilide compound in the presence of an acid catalyst to form an aromatic aldehyde; hydrolyzing the acid catalyst; and uninterruptedly reacting, in the resulting mixture, the aromatic aldehyde with an aromatic compound of the general formula

where R represents a substituted amino group, a morpholino group or a pyrrolidinyl group and B represents benzene or naphthalene that may be substituted by a halogen atom, an alkyl group, an aryl group, an aralkyl group or an alkoxy group, to form a triarylmethane compound of the general formula

where A represents benzene or naphthalene that is substituted by a lower alkoxy group or an unsubstituted or substituted amino group and may have another substituent, and B and R have the same meanings as given for the general formula (I).

BEST MODE FOR CARRYING OUT THE INVENTION

The benzene or naphthalene compound used as the starting material in the process of the present invention is a benzene or naphthalene compound that is substituted by a lower alkoxy group or an unsubstituted or substituted amino group and may have another substituent. More specifically, the benzene or naphthalene compound is a benzene compound of the general formula

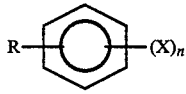

or a naphthalene compound of the general formula

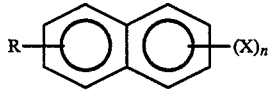

where X is a lower alkoxy group, a —NR$_1$R$_2$ group (in which R$_1$ and R$_2$ are lower alkyl groups, aryl groups or aralkyl groups), a morpholino group or a pyrrolidinyl group, R is a hydrogen atom, a halogen atom, a lower alkyl group or a cycloalkyl group, and n is an integer of 1 to 3. Specific examples of such compounds include dimethylaniline, diethylaniline, di-n-propylaniline, dimethylanisidine, dimethyltoluidine, diethyltoluidine, dimethylxylidine, dimethylnaphthylamine, diethylnaphthylamine, N-methyldiphenylamine, N-ethyldiphenylamine, methylbenzylaniline, ethylbenzylaniline, N-phenylmorpholine, N-phenylpyrrolidine and halogenated derivatives of the foregoing compounds; anisole, chloroanisole, phenetole, phenol butyl ether, cresol methyl ether, cresol ethyl ether, xylenol methyl ether, tert-butylphenol methyl ether, cyclohexylphenol methyl ether, dimethoxybenzene, trimethoxybenzene, naphthol methyl ether, naphthol ethyl ether and methoxydiphenyl; and the like.

Among these compounds, lower alkyl-substituted anilines such as dimethylaniline, diethylaniline, etc. and alkyl ethers of phenol and cresol are particularly preferred.

As the formylating agent for aromatic compounds, there is used a formamide compound or a formanilide compound. Specific examples of such compounds include formamide, dimethylformamide, diethylformamide, methylformanilide and the like.

The acid catalyst is an acid catalyst used for the Vilsmeyer reaction, and specific examples thereof include phosphorus oxychloride, phosphorus oxybromide, phosgene, thionyl chloride and the like.

In the formylation of the benzene or naphthalene compound, i.e. the reaction for forming an aromatic aldehyde compound, the formylating agent and the acid catalyst are used in amounts of 0.3 to 3 moles per moles of the benzene or naphthalene compound used as the starting material. The reaction may be carried out at a temperature ranging from room temperature to 100° C. for a period of time ranging from 0.5 to 40 hours.

After completion of the reaction, any unreacted compound may be recovered by conventional procedure, if desired. Then, the reaction mixture containing the aromatic aldehyde compound formed is diluted with water. As a result of the dilution with water, the acid catalyst used as a catalyst for conversion into an aldehyde was hydrolyzed to produce a mineral acid or acids with the evolution of heat. For example, phosphorus oxychloride (POCl$_3$) produces 3 moles of hydrochloric acid and 1 mole of phosphoric acid. The amount of water added is not critical, and the water may be added in an amount at least necessary to hydrolyze the acid catalyst. In order to allow the reaction to proceed smoothly, the water is usually used in an amount ranging from 0.1 to 50 times that of the reaction mixture.

Then, condensation is carried out by adding an aromatic compound of the above-described general formula (I) to the aqueous medium containing the aromatic aldehyde compound and mineral acid(s) so formed.

The aromatic compound used in this reaction with the aromatic aldehyde compound is a benzene or naphthalene compound of the above-described general formula (I) which contains one or more alkyl-, aryl- or arylalkyl-substituted amino groups in the molecule and may have another substituent. More specifically, the aromatic compound is a benzene compound of the general formula

or a naphthalene compound of the general formula

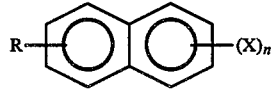

where X is an —NR$_1$R$_2$ group (in which R$_1$ and R$_2$ are hydrogen atoms, lower alkyl groups, aryl groups or aralkyl groups), a morpholino group or a pyrrolidinyl group, R is a hydrogen atom, a halogen atom, a lower alkyl group or a cycloalkyl group, and n is an integer of 1 to 3.

Specific examples of such compounds include methylaniline, dimethylaniline, ethylaniline, diethylaniline, isopropylaniline, n-propylaniline, butylaniline, diisopropylaniline, methyl-o-toluidine, dimethyl-o-toluidine, ethyl-o-toluidine, diethyl-o-toluidine, methyl-m-toluidine, dimethyl-m-toluidine, ethyl-m-toluidine, diethyl-m-toluidine, dibenzylaniline, methylbenzylaniline, diphenylamine, methyldiphenylamine, benzyl-o-toluidine, N-phenylmorpholine, N-phenylpyrrolidine, 1-N-dimethylaminonaphthalene, 1-N-ethylaminonaphthalene, 1-N-diethylaminonaphthalene and the like. The type of the compound used for this purpose may be the same as or different from that of the compound used in the first formylation step.

Theoretically, the amount of benzene compound or naphthalene compound used in this step may be two moles per mole of the aromatic compound used as the starting material. However, it is usually used in an amount of 2 to 3 moles.

Accordingly, where the three aryl groups of the triarylmethane are of the same type, it is possible to carry out the formylation step by using the benzene or naphthalene compound in an amount of 3 or more moles per mole of the formylating agent. After the formation of an aromatic aldehyde compound, water is added to the reaction mixture without recovering any unreacted compound and the resulting mixture is uninterruptedly subjected to condensation. Thus, the desired triarylmethane compound can be obtained.

The condensation may be carried out at a temperature ranging from 50° C. to reflux temperature. Generally, it is carried out at the boiling temperature of water for a period of time ranging from 2 to 100 hours.

In carrying out the condensation, an acid such as hydrochloric acid, sulfuric acid or the like may be added, if necessary. However, the amount of acid(s) formed by the decomposition of the catalyst for conversion into an aldehyde will generally be sufficient for this purpose.

On completion of the condensation, the reaction system is alkalified by the addition of an alkaline substance. If necessary, a small amount of a reducing agent (such as hydrosulfite or the like) may be added thereto for the purpose of preventing undesirable color development of the triarylmethane compound formed. Thereafter, any unreacted raw materials are expelled from the reaction system by steam distillation or other procedure. Thus, the desired triarylmethane compound can be obtained in high yield.

If necessary, the product may be further purified by recrystallizing it from an organic solvent.

According to the process of the present invention, the reactions are continuously carried out in the same equipment without isolating the aromatic aldehyde formed as an intermediate product from an aromatic compound used as the starting material, and an aqueous medium is used without need of any special organic solvent. Thus, triarylmethane compounds can be prepared in a rational manner and in high yield.

The process of the present invention is more specifically described with reference to the following examples.

EXAMPLE 1

83.0 g (0.54 mole) of phosphorus oxychloride was slowly added, drop by drop, to 33.3 g (0.45 mole) of dimethylformamide under cooling with ice. After stirring for a while, 55 g (0.45 mole) of dimethylaniline was added dropwise thereto and the resulting reaction mixture was stirred at 90° C. for 2 hours. A portion of the reaction product was extracted and analyzed by high-speed liquid chromatography to confirm that no dimethylaniline was detected. After the phosphorus oxychloride was hydrolyzed by adding 200 ml of ice water to the reaction mixture, 121.2 g (1 mole) of dimethylaniline was added thereto and the resulting mixture was stirred at 100° C. for 8 hours. On completion of the reaction, the reaction system was alkalified by the addition of 460 g of a 20% sodium hydroxide solution. After the addition of a small amount of hydrosulfite, the reaction system was steam distilled to recover 19.1 g of distillate. The reaction system was cooled, filtered and then washed with water to obtain 157.0 g of tris(4-dimethylaminophenyl)methane (in a 93.4% yield based on the dimethylaniline). The product was recrystallized from a xylene-ligroin mixture to obtain an 88% yield of crystals having a melting point of 180°-182° C. The results of elemental analysis were as follows.

| | Elemental analysis (%): | | |
|---|---|---|---|
| | C | H | N |
| Calculated | 80.38 | 8.37 | 11.25 |
| Found | 80.29 | 8.67 | 11.18 |

EXAMPLE 2

199.3 g (1.3 moles) of phosphorus oxychloride was slowly added, drop by drop, to 73.1 g (1.0 mole) of dimethylformamide under cooling with ice. After stirring for a while, 375.5 g (3.1 moles) of dimethylaniline was added dropwise thereto and the resulting reaction mixture was stirred at 80° C. for 2 hours. The formation of a reaction product was confirmed. After the reaction mixture was allowed to cool, 400 ml of water was slowly added, drop by drop, to the reaction mixture. Thus, the temperature of the reaction system rose to 80° C. as the decomposition of the catalyst proceeded. Thereafter, condensation was carried out by stirring the reaction system at 100° C. for 10 hours. On completion of the condensation, the reaction system was alkalified by the addition of 1,000 g of a 20% sodium hydroxide solution. After the addition of a small amount of hydrosulfite, the reaction system was steam distilled to recover 26.4 g of unreacted raw material (dimethylaniline). The reaction system was cooled, filtered and then washed with water to obtain 358.6 g of tris(4-dimethylaminophenyl)methane (in a 95.9% yield based on the dimethylformamide).

COMPARATIVE EXAMPLE 1

83.0 g (0.54 mole) of phosphorus oxychloride was slowly added, drop by drop, to 33.3 g (0.45 mole) of dimethylformamide under cooling with ice. After stirring for a while, 55 g (0.45 mole) of dimethylaniline was added dropwise thereto and the resulting reaction mixture was stirred at 90° C. for 2 hours. The catalyst was slowly decomposed by the addition of 200 ml of ice water and the resulting mixture was made weakly alkaline by the addition of 350 g of a 20% aqueous sodium hydroxide solution. After the mixture was cooled by allowing it to stand for a while, the precipitated 4-dimethylaminobenzaldehyde was separated by filtration, washed thoroughly with water to remove any salts and impurities, and then dried at 50° C. Thus, there was obtained 59.8 g of 4-dimethylaminobenzaldehyde (in an 89% yield based on the dimethylaniline).

A mixture consisting of 44.76 g (0.3 mole) of the 4-dimethylaminobenzaldehyde thus obtained, 76.3 g (0.63 mole) of dimethylaniline and 247 g of a 20% aqueous HCl solution was condensed by stirring it at 100° C. for 8 hours to obtain 106.4 g of tris(4-dimethylaminophenyl)methane.

The overall yield of tris(4-dimethylaminophenyl)methane based on the dimethylaniline initially used for conversion into an aldehyde was 84.5%.

In contrast to Example 1, this comparative example used large amounts of alkali and acid and required a procedure for the isolation of dimethylaminobenzaldehyde. Moreover, the yield of tri(4-dimethylaminophenyl)methane was comparatively low.

EXAMPLE 3

18.5 g (0.25 mole) of dimethylformamide was reacted with 46.2 g (0.30 mole) of phosphorus oxychloride in the same manner as in Example 1. Then, 40 g (0.25 mole) of α-naphthol methyl ether was added dropwise thereto with cooling and the resulting reaction mixture was stirred at 90° C. for 8 hours. A portion of the reaction product was extracted and analyzed by high-speed liquid chromatography to confirm that no α-naphthol methyl ether was detected. After the phosphorus oxychloride was hydrolyzed by adding 150 ml of ice water to the reaction mixture, 65 g (0.54 mole) of dimethylaniline was added thereto and the resulting mixture was heated and stirred at 100° C. for 20 hours. On completion of the reaction, the reaction system was alkalified by the addition of 230 g of a 20% sodium hydroxide solution. After the addition of a small amount of hydrosulfite, the reaction system was steam distilled to recover 17 g of distillate. The reaction system was cooled, filtered and then washed with water to obtain 76.3 g of bis(4-dimethylaminophenyl)-4'-methoxynaphthol-1'-methane (in a 74.3% yield). The product was recrystallized from a benzene-ligroin mixture to obtain crystals having a melting point of 183-185° C. The results of elemental analysis were as follows.

| | Elemental analysis (%): | | |
|---|---|---|---|
| | C | H | N |
| Calculated | 81.91 | 7.37 | 6.82 |
| Found | 82.40 | 7.46 | 6.60 |

EXAMPLE 4

23.4 g (0.32 mole) of dimethylformamide was reacted with 58.9 g (0.38 mole) of phosphorus oxychloride in the same manner as in Example 1. Then, 43.6 g (0.32 mole) of o-cresol ethyl ether was added dropwise thereto under cooling with ice and the resulting reaction mixture was stirred at 90° C. for 8 hours. A portion of the reaction product was extracted and analyzed by high-speed liquid chromatography to confirm that no o-cresol ethyl ether was detected. After the phosphorus oxychloride was hydrolyzed by adding 200 ml of ice water to the reaction mixture, 85.3 g (0.70 mole) of dimethylaniline was added thereto and the resulting mixture was stirred at 100° C. for 30 hours. On completion of the reaction, the reaction system was alkalified by the addition of 300 g of a 20% sodium hydroxide solution, and then steam distilled to recover 45.5 g of distillate. The resulting crude product, in the form of starch syrup, was recrystallized from ligroin to obtain 53.8 g of bis(4-dimethylaminophenyl)-3'-methyl-4'-ethoxyphenylmethane as crystals having a melting point of 77°-79° C. The results of elemental analysis were as follows.

| | Elemental analysis (%): | | |
|---|---|---|---|
| | C | H | N |
| Calculated | 80.37 | 8.30 | 7.21 |
| Found | 78.28 | 7.81 | 7.14 |

EXAMPLE 5

According to the same procedure as described in Example 1, p-dimethylaminobenzaldehyde was synthesized and the phosphorus oxychloride was hydrolyzed. Then, 217 g (11 moles) of N-methyl-N-benzylaniline was added and the resulting mixture was reacted at 100° C. for 24 hours.

On completion of the reaction, the reaction system was alkalified by the addition of 460 g of a 20% aqueous sodium hydroxide solution. After the addition of a small amount of hydrosulfite, the reaction system was steam distilled to recover unreacted raw material. The reaction system was cooled, filtered, washed with water and then dried under reduced pressure to obtain 216.7 g of bis(N-methyl-N-benzylaminophenyl)-N,N-dimethylaminophenylmethane (in a 91.6% yield based on the dimethylaniline).

The product was recrystallized from ligroin to obtain crystals having a melting point of 76°-78° C.

The results of elemental analysis were as follows.

| | Elemental analysis (%): | | |
|---|---|---|---|
| | C | H | N |
| Calculated | 84.53 | 7.48 | 7.99 |
| Found | 84.57 | 7.39 | 8.04 |

EXAMPLE 6

103.5 g (0.9 mole) of thionyl chloride was slowly added, drop by drop, to 33.3 g (0.45 mole) of dimethylformamide under cooling with ice. After stirring for a while, 55 g (0.45 mole) of dimethylaniline was added dropwise thereto and the resulting reaction mixture was stirred at 90° C. for 2 hours. A portion of the reaction product was extracted and analyzed by high-speed liquid chromatography to confirm that no dimethylaniline was detected. After the thionyl chloride was hydrolyzed by adding 200 ml of ice water to the reaction mixture, 121.2 g (1.0 mole) of dimethylaniline was added thereto and the resulting mixture was condensed by stirring at 100° C. for 8 hours. On completion of the reaction, the reaction system was alkalified by the addition of 550 g of a 20% aqueous NaOH solution. After the addition of a small amount of hydrosulfite, the reaction system was stirred for a while and then steam distilled to recover 18 g of unreacted dimethylaniline. The reaction system was cooled, filtered and then washed with water to obtain 150 g of tris(4-dimethylaminophenyl)methane (in an 89.2% yield based on the dimethylaniline).

EXAMPLES 7-14

The raw materials shown in the following table were treated in substantially the same manner as described in Example 1. As a result, there were obtained the respective triarylmethane compounds.

| Example | Compound to be formylated | Compound used for condensation with aldehyde | Triarylmethane compound formed | Solvent for recrystallization and melting point of purified product | Yield of crude product based on compound to be formylated |
|---|---|---|---|---|---|
| 7 | N(CH₃)₂-C₆H₅ | N(C₂H₅)₂-C₆H₅ | [(CH₃)₂N-C₆H₄]-CH-[C₆H₄-N(C₂H₅)₂]₂ | Ligroin, 92–93° C. | 93.4 |
| 8 | " | 2-CH₃, N(H)(CH₃)-C₆H₄ | [(CH₃)₂N-C₆H₄]-CH-[C₆H₃(CH₃)-N(H)(CH₃)]₂ | Ligroin, 134–136° C. | 84.7 |
| 9 | " | N(CH₃)(CH₂-C₆H₄-CH₃)-C₆H₅ | [(CH₃)₂N-C₆H₄]-CH-[C₆H₄-N(CH₃)(CH₂-C₆H₄-CH₃)]₂ | Ligroin, 103–105° C. | 90.2 |
| 10 | " | 2-CH₃, NHCH₂-C₆H₅ aniline | [(CH₃)(CH₃NH-)C₆H₃]-CH-[C₆H₃(CH₃)-NHCH₂-C₆H₅]₂ | Ligroin, 124–126° C. | 82.5 |
| 11 | morpholinobenzene | N(CH₃)₂-C₆H₅ | [morpholino-C₆H₄]-CH-[C₆H₄-N(CH₃)₂]₂ | Xylene, 203–205° C. | 86.4 |
| 12 | N(CH₃)₂-C₆H₅ | N(CH₃)₂-naphthyl | [(CH₃)₂N-naphthyl]-CH-[C₆H₄-N(CH₃)₂]₂ | Ligroin, 181–182° C. | 69.8 |

-continued

| Example | Compound to be formylated | Compound used for condensation with aldehyde | Triarylmethane compound formed | Solvent for recrystallization and melting point of purified product | Yield of crude product based on compound to be formylated |
|---|---|---|---|---|---|
| 13 | CH₃-N(-C₆H₅)(-C₆H₅) [N-methyldiphenylamine] | (CH₃)₂N-C₆H₅ [N,N-dimethylaniline] | [structure: CH(C₆H₄-N(CH₃)₂)₂ with N(CH₃)(C₆H₅)] | Xylene/ligroin, 180–182° C. | 73.6 |
| 14 | CH₃-N(-C₆H₅)(-CH₂-C₆H₅) [N-methyl-N-benzylaniline] | " | [structure: CH(C₆H₄-N(CH₃)₂)₂ with N(CH₃)(CH₂C₆H₅)] | Ligroin, 118–119° C. | 88.8 |

EXAMPLES 15-9

The raw materials shown in the following table were treated in the same manner as described in Example 4. As a result, there were obtained the respective triarylmethane compounds.

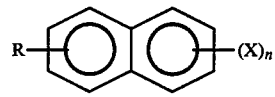

(III)

| Example | Compound to be formylated | Compound used for condensation with aldehyde | Triarylmethane compound formed | Solvent for recrystallization and melting point of purified product | Yield of crude product based on compound to be formylated |
|---|---|---|---|---|---|
| 15 | ⟨⟩—OC₂H₅, CH₃ | ⟨⟩—N(CH₃)₂ | C₂H₅O—⟨⟩(CH₃)—CH—[⟨⟩—N(CH₃)₂]₂ | Ligroin, 79–81° C. | 55.3 |
| 16 | ⟨⟩—OCH₃, CH₃ | ⟨⟩—N(H)(CH₃), CH₃ | CH₃O—⟨⟩(CH₃)—CH—[⟨⟩(CH₃)—NHCH₃]₂ | Ligroin, 107–109° C. | 64.8 |
| 17 | ⟨⟩—OC₂H₅, CH₃ | ⟨⟩—N(CH₂—CH₂)(CH₂—CH₂) | C₂H₅O—⟨⟩(CH₃)—CH—[⟨⟩—N(CH₂—CH₂)(CH₃—CH₂)]₂ | Ligroin, 138–140° C. | 57.5 |
| 18 | ⟨⟩—OCH₃, t-C₄H₉ | ⟨⟩—N(CH₃)₂ | CH₃O—⟨⟩(t-C₄H₉)—CH—[⟨⟩—N(CH₃)₂]₂ | Ligroin, 146–148° C. | 60.4 |
| 19 | ⟨⟩—OCH₃, H | " | CH₃O—⟨⟩(H)—CH—[⟨⟩—N(CH₃)₂]₂ | Ligroin, 180–182° C. | 50.9 |

We claim:

1. Process for the preparation of a triarylmethane compound of the formula (I):

R—Q—CH—Q—R (I)
      |
      A wherein A is a benzene compound as defined by formula (II) below or a naphthalene compound as defined by formula (III) below and Q—R is a benzene compound as defined by formula (IV) below or a naphthalene compound as defined by formula (V) below, which comprises: reacting a benzene compound of formula (II):

(II)

or a naphthalene compound of formula (III):

wherein X is a lower alkoxy group, an —NR₁R₂ group, in which R₁ and R₂ are each a lower alkyl group, phenyl group or benzyl group, a morpholino group or a pyrrolidinyl group, R is a hydrogen atom, a halogen atom or a cyclohexyl group, and n is an integer of 1 to 3, with a formamide or formanilide compound in the presence of an acid catalyst selected from the group consisting of phosphorus oxychloride, phosphorus oxybromide, phosgene and thionyl chloride, to form an aromatic aldehyde; adding water to the reaction mixture containing the aromatic aldehyde and thereby hydrolyzing the acid catalyst; and uninterruptedly reacting, in the resultant mixture, the aromatic aldehyde with a benzene compound of formula (IV):

(IV)

or a naphthalene compound of the general formula:

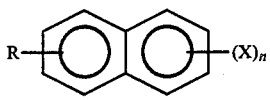 (V)

wherein X is an —NR$_1$R$_2$ group, in which R$_1$ and R$_2$ are each a lower alkyl group, phenyl group or benzyl group, a morpholino group or a pyrrolidinyl group, R is a hydrogen atom, a halogen atom, a lower alkyl group or a cyclohexyl group, and n is an integer of 1 to 3, thereby forming the triarylmethane compound at a high yield and in a high purity.

2. A process as claimed in claim 1 wherein the benzene compound of the formula (II) or the naphthalene compound of the formula (III) to be formulated is of the same type as the benzene compound of the formula (IV) or the naphthalene compound of the formula (V).

3. A process as claimed in claim 1 wherein the molar ratio of the benzene compound of the formula (II) or the naphthalene compound of the formula (III) to the formamide or formanilide compound ranges from 1:0.3 to 1:3.

4. A process as claimed in claim 1 wherein the reaction of the benzene compound of the formula (II) or the naphthalene compound of the formula (III) with the formamide or formanilide compound is carried out at a temperature ranging from room temperature to 100° C.

5. A process as claimed in claim 1 wherein the molar ratio of the aromatic aldehyde to the benzene compound of the formula (IV) or the naphthalene compound of the formula (V) ranges from 1:2 to 1:3.

6. A process as claimed in claim 1 wherein the reaction of the aromatic aldehyde with the aromatic compound of the formula (IV) or the naphthalene compound of the formula (V) was carried out at a temperature ranging from 50° C. to reflux temperature.

* * * * *